(12) United States Patent
Ji

(10) Patent No.: US 8,960,364 B2
(45) Date of Patent: Feb. 24, 2015

(54) PINION SENSOR ASSEMBLY, PINION SENSOR COVER ASSEMBLY, AND ELECTRONIC POWER STEERING APPARATUS HAVING THE SAME PIPE

(71) Applicant: Mando Corporation, Pyeongtaek-si, Gyeonggi-do (KR)

(72) Inventor: Sung Ho Ji, Seoul (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 12 days.

(21) Appl. No.: 13/707,231

(22) Filed: Dec. 6, 2012

(65) Prior Publication Data

US 2013/0140105 A1 Jun. 6, 2013

(30) Foreign Application Priority Data

Dec. 6, 2011 (KR) ........................ 10-2011-0129646

(51) Int. Cl.
*B62D 5/04* (2006.01)
*B62D 6/10* (2006.01)
*F16H 19/04* (2006.01)

(52) U.S. Cl.
CPC ................ *B62D 6/10* (2013.01); *B62D 5/0403* (2013.01); *F16H 19/04* (2013.01)
USPC ............................. 180/446; 180/443; 180/444

(58) Field of Classification Search
CPC ........ B62D 5/04; B62D 5/046; B62D 5/0463; B62D 5/0403
USPC ......................................... 180/446, 443, 444
See application file for complete search history.

(56) References Cited

U.S. PATENT DOCUMENTS

| | | | | |
|---|---|---|---|---|
| 4,771,845 A | * | 9/1988 | Shimizu .......................... | 180/446 |
| 4,799,566 A | * | 1/1989 | Shimizu .......................... | 180/446 |
| 5,133,423 A | * | 7/1992 | Ijiri et al. ........................ | 180/444 |
| 5,836,419 A | * | 11/1998 | Shimizu et al. ................ | 180/443 |
| 6,364,049 B1 | * | 4/2002 | Iwasaki et al. ................. | 180/444 |
| 7,154,244 B2 | * | 12/2006 | Asaumi et al. ................. | 318/599 |
| 7,325,646 B2 | * | 2/2008 | Asada ............................. | 180/444 |
| 7,357,216 B2 | * | 4/2008 | Ishii et al. ...................... | 180/444 |
| 8,066,092 B2 | * | 11/2011 | Shimizu et al. ................ | 180/444 |
| 8,196,698 B2 | * | 6/2012 | Tamaki .......................... | 180/444 |
| 2003/0042064 A1 | * | 3/2003 | Takekawa et al. ............. | 180/444 |
| 2004/0080295 A1 | * | 4/2004 | Asaumi et al. ................. | 318/599 |
| 2005/0257992 A1 | * | 11/2005 | Shiino et al. ................... | 180/444 |
| 2006/0055139 A1 | * | 3/2006 | Furumi et al. ............ | 280/93.513 |
| 2008/0164088 A1 | * | 7/2008 | Shimizu .......................... | 180/446 |
| 2008/0230302 A1 | * | 9/2008 | Tamaki .......................... | 180/443 |

(Continued)

FOREIGN PATENT DOCUMENTS

DE 102007032907 A1 5/2008
DE 102007059361 A1 9/2008

(Continued)

*Primary Examiner* — Kevin Hurley
*Assistant Examiner* — Michael Stabley
(74) *Attorney, Agent, or Firm* — McDermott Will & Emery LLP

(57) ABSTRACT

Disclosed are a pinion sensor assembly and an electric power steering apparatus having the same. According to the present invention, it is possible to substantially reduce the number of constitutional elements to be assembled when assembling a torque sensor and neighboring elements, to reduce an error in change of torque caused by accumulation of assembling errors of the constitutional elements, thereby preventing a malfunction, and to enhance assemblability.

8 Claims, 12 Drawing Sheets

(56) References Cited

U.S. PATENT DOCUMENTS

| | | | |
|---|---|---|---|
| 2008/0271942 A1* | 11/2008 | Yamashita et al. | 180/443 |
| 2009/0120711 A1* | 5/2009 | Shiino | 180/443 |
| 2009/0218162 A1* | 9/2009 | Miyoshi et al. | 180/443 |
| 2010/0126794 A1* | 5/2010 | Shiino et al. | 180/444 |
| 2011/0240400 A1* | 10/2011 | Shimizu | 180/446 |
| 2012/0018242 A1* | 1/2012 | Yamamoto | 180/444 |

FOREIGN PATENT DOCUMENTS

| | | |
|---|---|---|
| DE | 102007025200 A1 | 12/2008 |
| DE | 102008009772 A1 | 8/2009 |
| EP | 2020590 A2 | 2/2009 |
| WO | 2005097577 A1 | 10/2005 |
| WO | 2008068339 A1 | 6/2008 |

* cited by examiner

PINION SENSOR ASSEMBLY, PINION SENSOR COVER ASSEMBLY, AND ELECTRONIC POWER STEERING APPARATUS HAVING THE SAME PIPE

CROSS-REFERENCE TO RELATED APPLICATION

This application claims priority from and the benefit under 35 U.S.C. §119(a) of Korean Patent Application No. 10-2011-0129646, filed on Dec. 6, 2011, which is hereby incorporated by reference for all purposes as if fully set forth herein.

BACKGROUND OF THE INVENTION

1. Field of the Invention

The present invention relates to an electric power steering apparatus. More particularly, the present invention relates to a pinion sensor assembly, a pinion sensor cover assembly, and an electric power steering apparatus having the same that can reduce a measurement error caused by accumulation of assembly errors of constitutional components when a torque sensor and a neighboring element are assembled, thereby preventing a malfunction, and enhancing assemblability.

2. Description of the Prior Art

In general, a hydraulic power steering apparatus which uses hydraulic power of a hydraulic pump has been typically used as a power steering apparatus for a vehicle. However, recently, an electric power steering apparatus using a motor is gradually popularized.

An ordinary electric power steering apparatus includes a steering system extending from a steering wheel to opposite side vehicle wheels, and an assistant power mechanism for supplying steering assisting power to the steering system.

The assistant power mechanism includes: a torque sensor configured to sense a steering torque applied to the steering wheel by a driver and to output an electric signal which is proportional to the sensed steering torque; an electronic control unit (ECU) configured to generate a control signal based on the electric signal transmitted from the torque sensor; a motor configured to generate a steering assisting power based on the control signal transmitted from the ECU; and a belt type power transmission apparatus configured to transmit the assisting power generated by the motor to a rack bar through a belt.

FIG. 1 is a partial cross-sectional view schematically illustrating a rack-driving type power steering apparatus according to the prior art, and FIGS. 2a and 2b are a cross-sectional view and an exploded perspective view schematically illustrating a part of the rack-driving type power steering apparatus of the prior art.

As illustrated in the drawings, the rack-driving type power steering apparatus according to the prior art includes: a rack bar 140 extending in a transverse direction of the vehicle, and having a rack gear on a side of the outer peripheral surface thereof; a pinion shaft 110 provided with a pinion gear engaged with the rack gear; a ball nut 210 engaged with a outer peripheral screw flute 145 via balls 220; a belt type transmission apparatus 160 configured to interconnect the ball nut 210 and a motor spindle 155; and a motor 150.

The pinion shaft 110 is connected to the steering wheel through a steering shaft, and the rack bar 140, which is formed with the outer peripheral screw flute 145 with a predetermined length on a side of the outer periphery thereof, is incorporated in a rack housing 120.

The belt type transmission apparatus 160 includes a belt for interconnecting the motor spindle 155 and the ball nut 210, and transmits the steering assisting power generated by the motor 150 in proportion to the steering torque applied to the steering wheel to the rack bar 140 through the ball nut 210.

The rack driving type power steering apparatus of the prior art as illustrated in FIGS. 2a and 2b includes: a rack bar 140 provided with a peripheral screw flute 145 on the outer periphery thereof; a ball nut 210 having a intermediate path 215; balls 220 adapted to be moved by rolling while being in contact with the outer peripheral screw flute 145 of the rack bar 140 and the intermediate path 215, the balls 220 being circulated through the intermediate path 215; and an end cap 230 attached to an end of the ball nut 210.

The rack-driving type power steering apparatus causes the rack bar 140 to slide as the balls 220 are moved by rolling while being in contact with the outer peripheral screw flute 145 of the rack bar 140 and the inner peripheral screw peripheral flute of the ball nut 210.

In addition, a pinion shaft 110 and a torque sensor 239 are coupled to the rack housing 120, and a connector 241 of a wire harness 243 inserted through a side of the rack housing 120 is coupled to the torque sensor 239, and then a bearing 237 is coupled to the pinion shaft 110.

When the pinion shaft 110 and the torque sensor 239 are coupled to the rack housing 120 in this manner, a rack housing cover 235, to the top of which a sealing member 245 is coupled, is coupled to the rack housing 120 by fastening members, thereby completing the assembly.

However, such a conventional electric power steering apparatus has problems in that due to a number of constitutional elements, assembling steps are increased which in turn increases manufacturing costs, and due to the accumulation of assembling errors of many constitutional elements, an error may occur in measuring a torque change.

SUMMARY OF THE INVENTION

Accordingly, the present invention has been made to solve the above-mentioned problems in the prior art, and an object of the present invention is to provide a pinion sensor assembly, a pinion sensor cover assembly and an electric power steering apparatus having the same that can reduce a measurement error caused by accumulation of assembly errors of constitutional components when a torque sensor and a neighboring element are assembled, thereby preventing a malfunction, and enhancing assemblability.

In order to accomplish this object, according to a first exemplary embodiment of the present invention, there is provided a pinion sensor assembly including: an input shaft connected with a steering shaft; a pinion shaft, the top side of which is coupled with the input shaft, and the bottom side of which is inserted into a rack housing to be engaged with a rack bar; and a torque sensor provided with a wire harness connector, the input shaft and the pinion shaft being axially inserted through and coupled to the torque sensor.

In accordance with a second exemplary embodiment of the present invention, there is provided a pinion sensor cover assembly including a pinion sensor assembly and a cover assembly. The pinion sensor assembly includes: an input shaft connected with a steering shaft; a pinion shaft, the top side of which is coupled with the input shaft, and the bottom side of which is inserted into a rack housing to be engaged with a rack bar; and a torque sensor provided with a wire harness connector, the input shaft and the pinion shaft being axially inserted through and coupled to the torque sensor. The cover assembly includes: a cover formed with a through-hole, through which the input shaft is inserted, in the top side thereof and a space, which is opened to house the torque sensor, in the bottom side thereof, the cover being provided with a fixing unit at a side thereof to fix a wire connected with the wire harness connector; a sealing member coupled to the inside of the through-hole of the cover and tightly contacted with the outer periphery of the input shaft to prevent the introduction of foreign matter from the outside; and a support member coupled to the inside of the through-hole of the cover to support the rotation of the input shaft.

In accordance with a third exemplary embodiment of the present invention, there is provided an electric power steering apparatus including a pinion sensor assembly, a cover assembly, and a rack housing. The pinion sensor assembly includes: an input shaft connected with a steering shaft; a pinion shaft, the top side of which is coupled with the input shaft, and the bottom side of which is inserted into a rack housing to be engaged with a rack bar; and a torque sensor provided with a wire harness connector, the input shaft and the pinion shaft being axially inserted through and coupled to the torque sensor. The cover assembly includes: a cover formed with a through-hole, through which the input shaft is inserted, in the top side thereof and a space, which is opened to house the torque sensor, in the bottom side thereof, the cover being provided with a fixing unit at a side thereof to fix a wire connected with the wire harness connector; a sealing member coupled to the inside of the through-hole of the cover and tightly contacted with the outer periphery of the input shaft to prevent the introduction of foreign matter from the outside; and a support member coupled to the inside of the through-hole of the cover to support the rotation of the input shaft. The rack housing, on one side thereof, includes: a seating surface, on which the torque sensor is seated; a cover coupling part formed around the outer periphery of the seating surface, the cover being coupled to the cover coupling part; and a pinion coupling part formed in the inside of the seating surface, and formed with a shaft hole, into which the pinion shaft is inserted, and the rack housing, on the other side thereof, includes: a power assisting module configured to be driven by an electronic control unit according to the torque value measured by the torque sensor.

According to the present invention as described above, it is possible to reduce a measurement error caused by accumulation of assembly errors of constitutional components when a torque sensor and a neighboring element are assembled, thereby preventing a malfunction, and to enhance assemblability.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
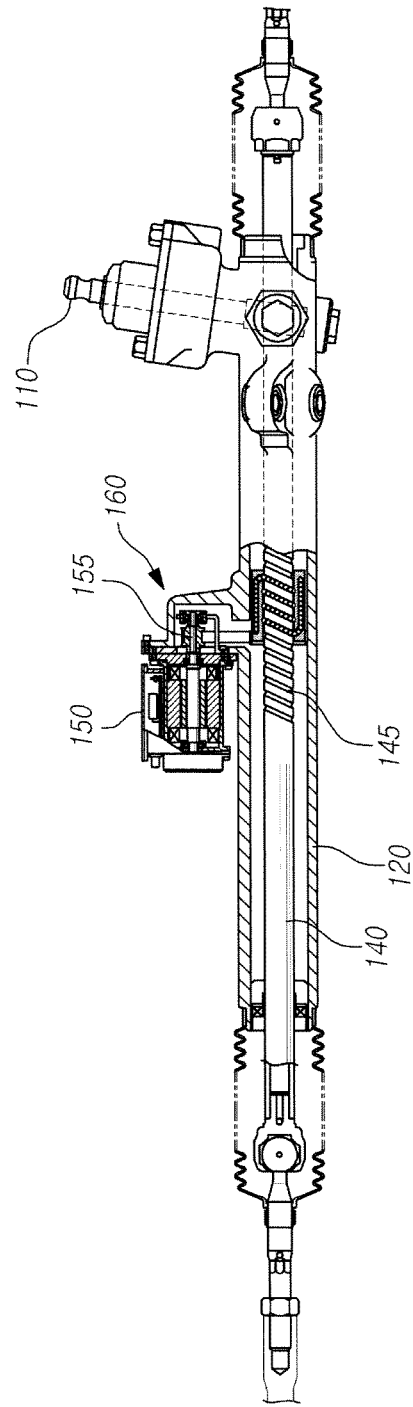
FIG. 1 is a partial cross-sectional view schematically illustrating a rack-driving type power steering apparatus according to the prior art.
Figure 2A:
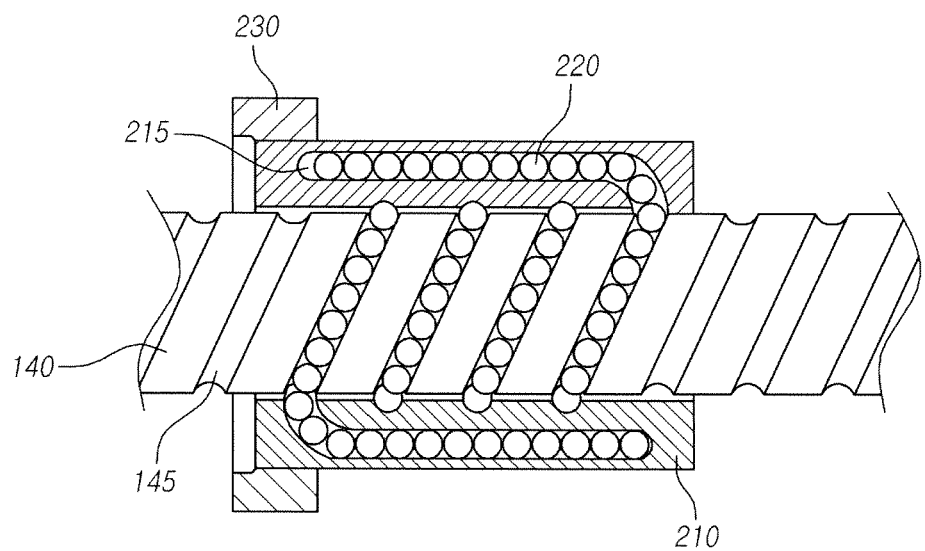
FIGS. 2a and 2b are a cross-sectional view and an exploded perspective view schematically illustrating a part of the rack-driving type power steering apparatus of the prior art.
Figure 2B:
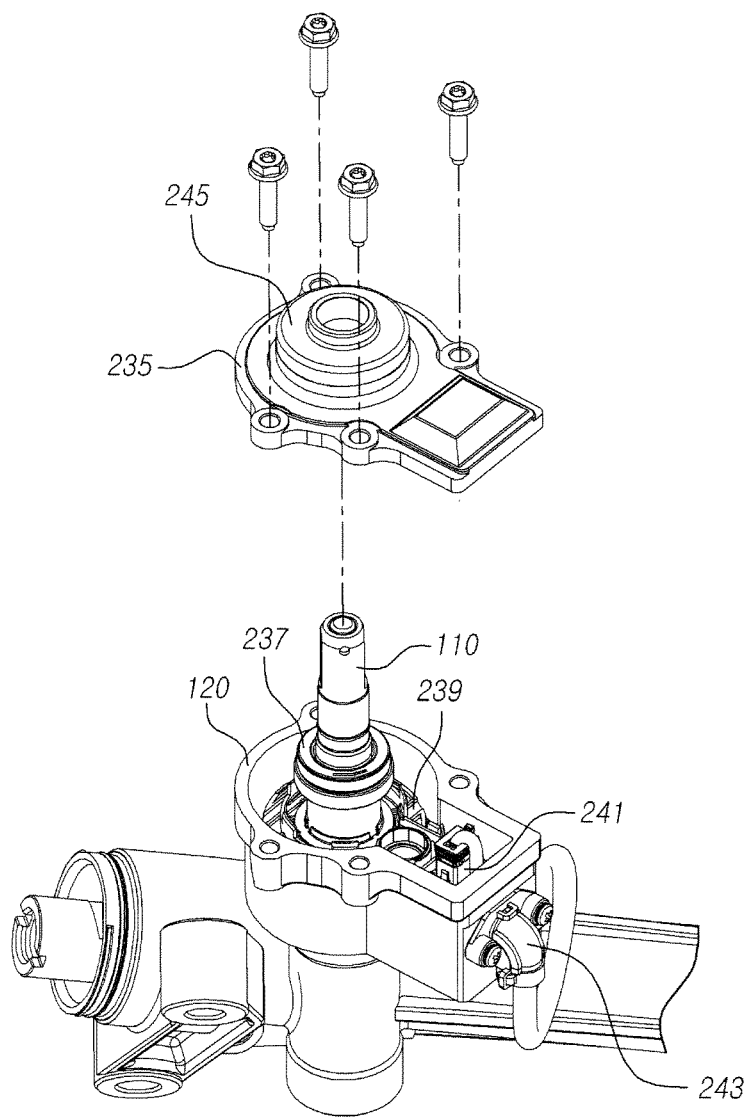

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
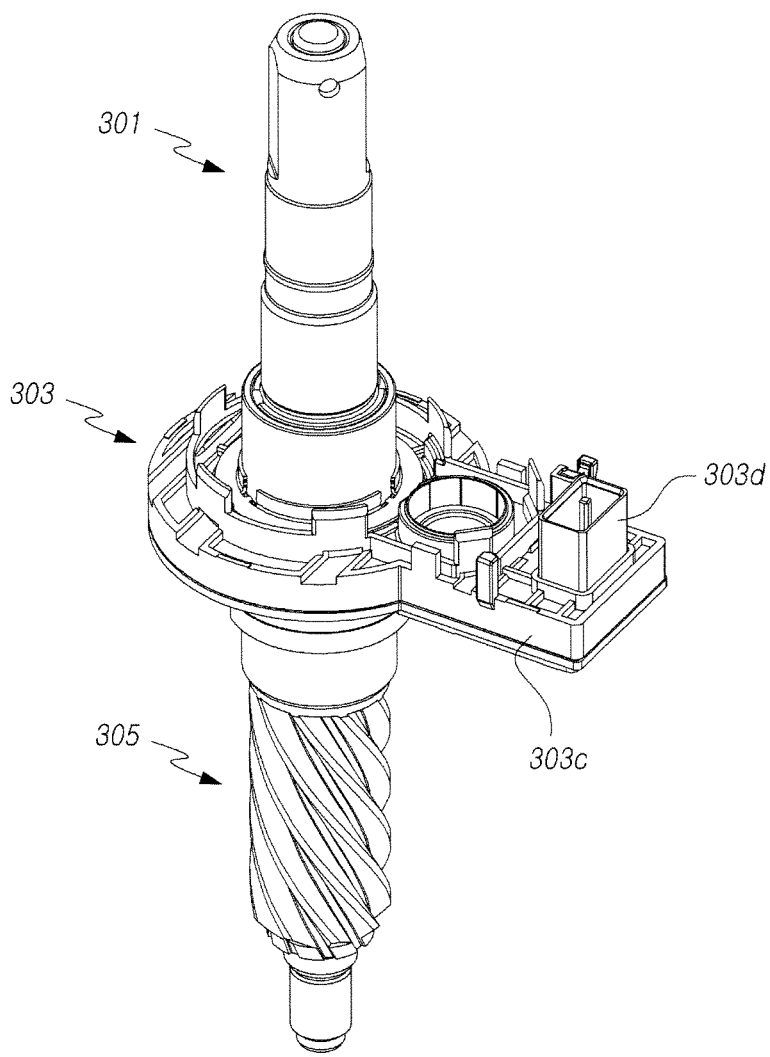
FIGS. 3 and 4 are a perspective view and a cross-sectional view illustrating a pinion sensor assembly according to a first exemplary embodiment of the present invention, respectively.
Figure 4:
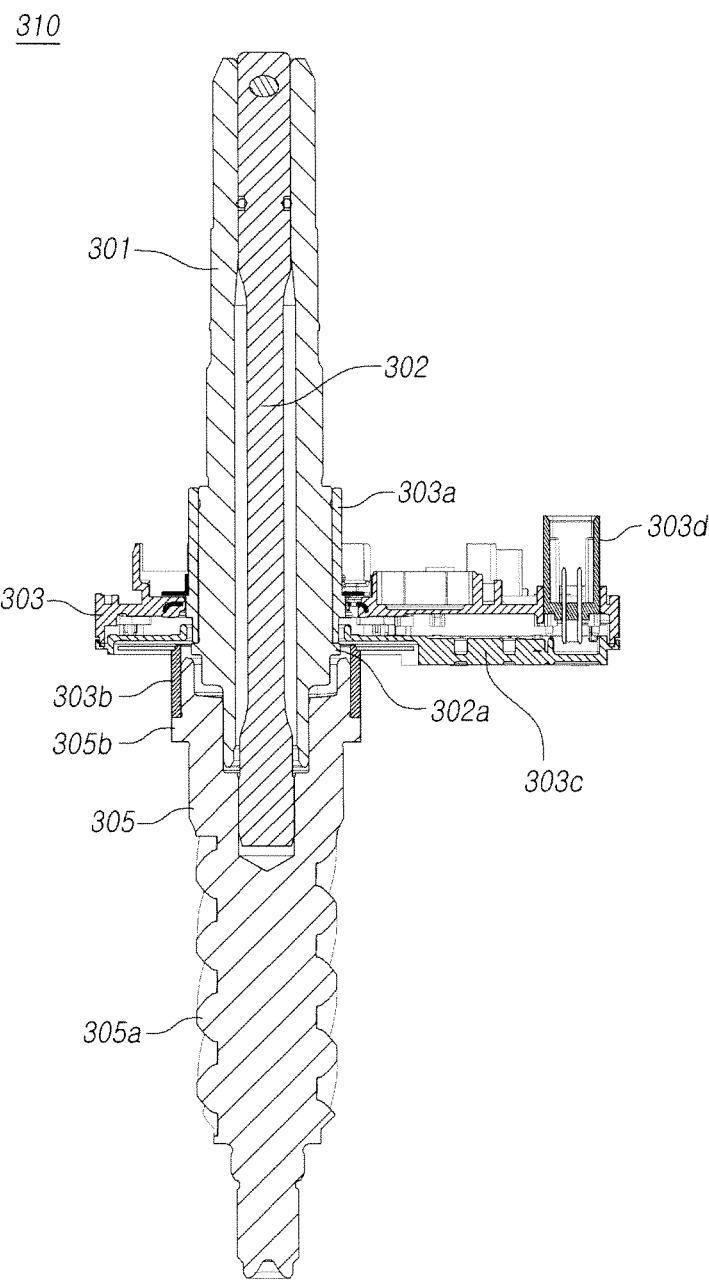
Figure 5:
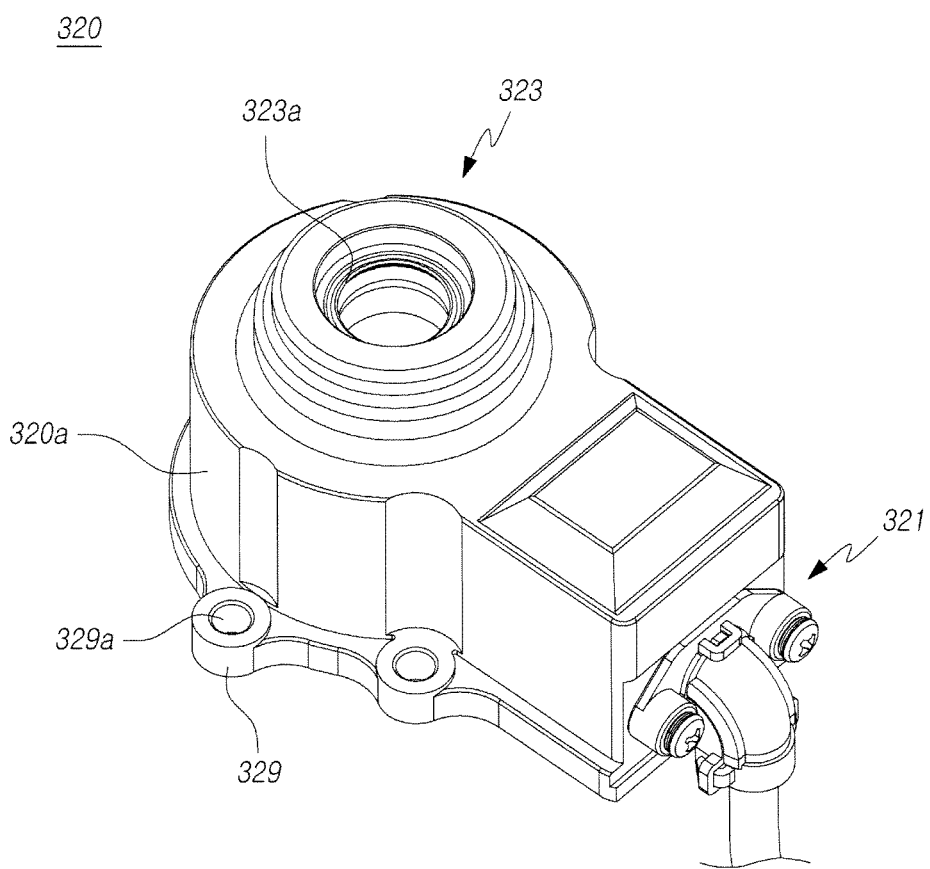
FIGS. 5 and 6 are a perspective view and a cross-sectional view illustrating a cover assembly in a second exemplary embodiment of the present invention, respectively.
Figure 6:
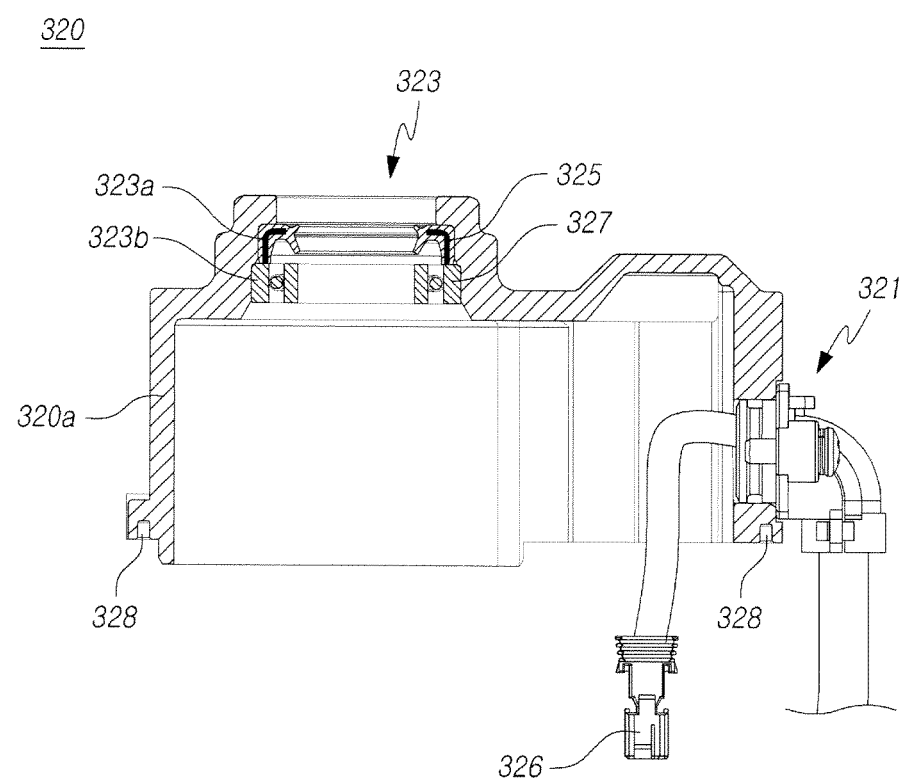
Figure 7:
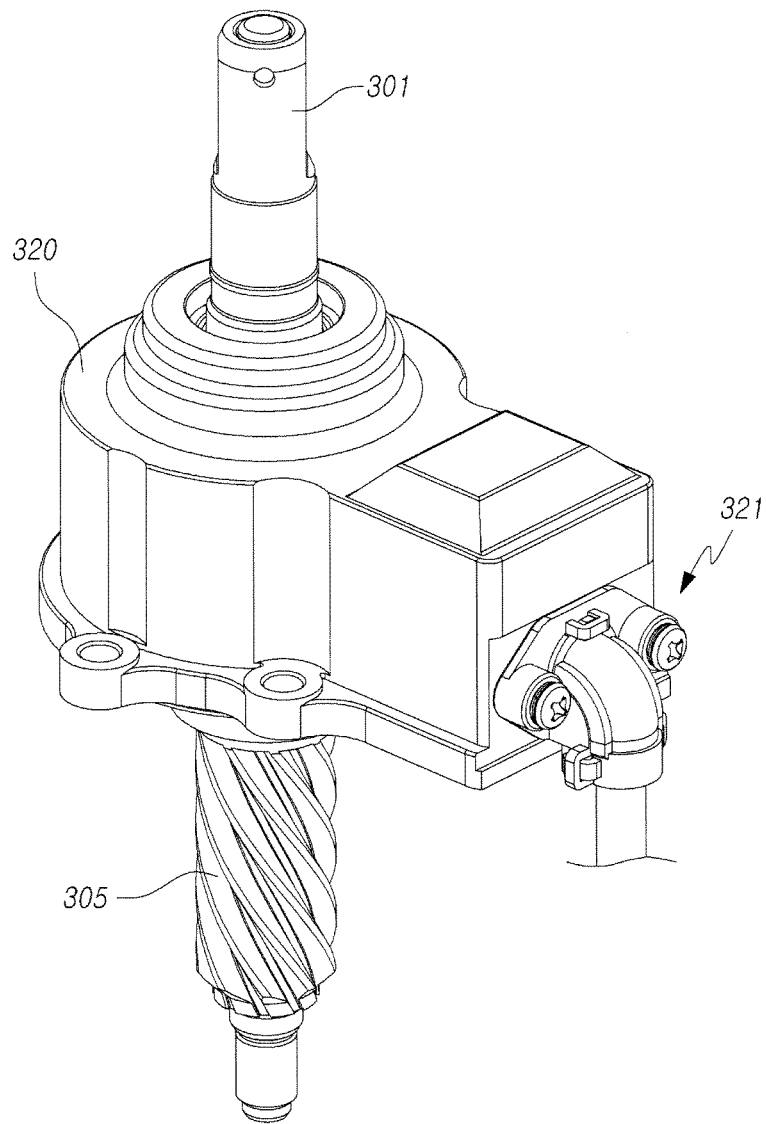
FIGS. 7 to 9 are a perspective view, an exploded perspective view and a cross-sectional illustrating a pinion sensor cover assembly according to the second exemplary embodiment of the present invention, respectively.
Figure 8:
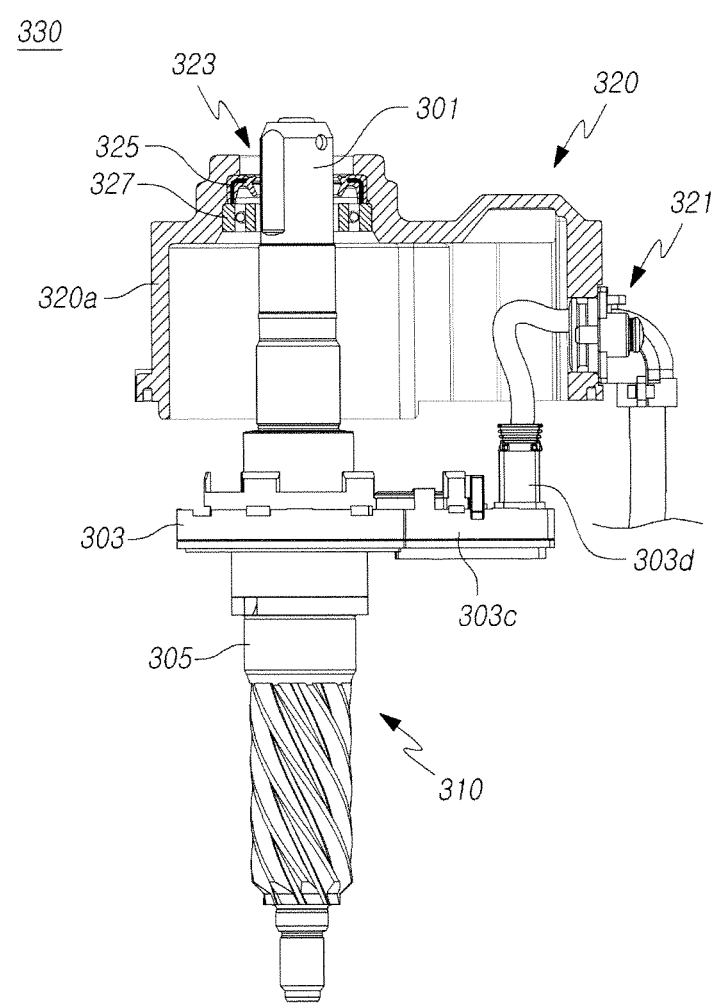
Figure 9:
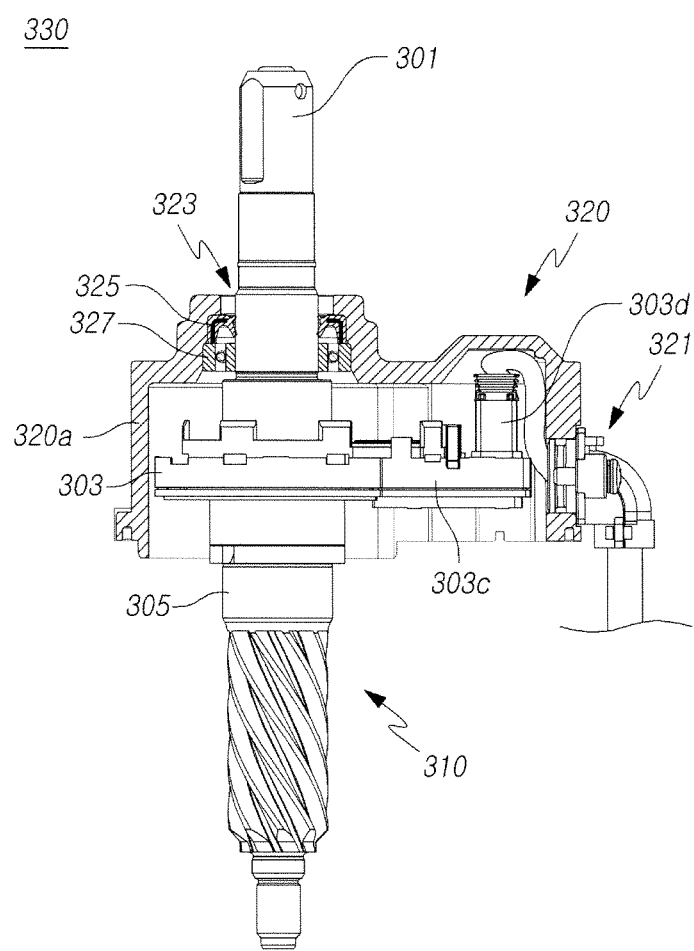
Figure 10:
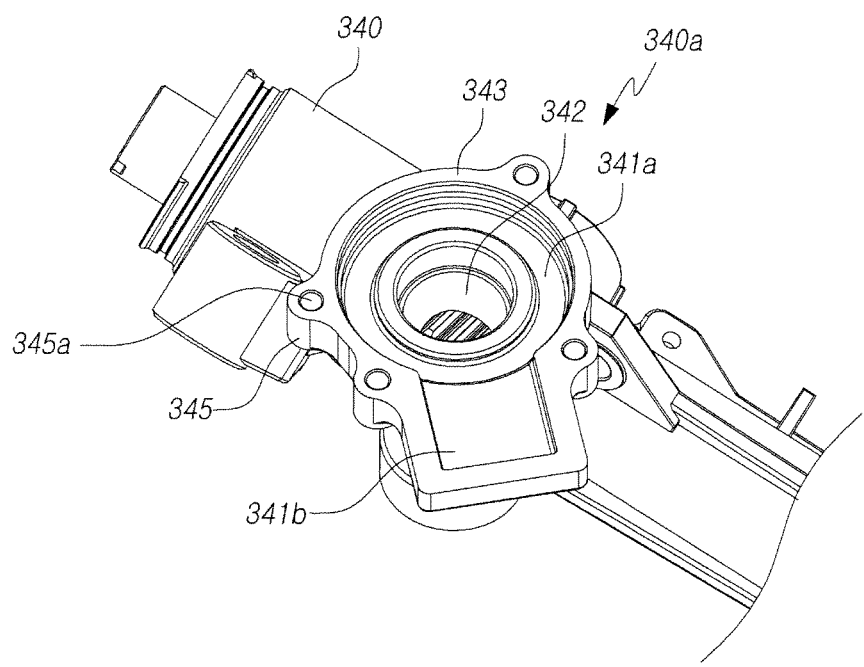
FIGS. 10 and 11 are perspective views illustrating a rack housing and an electric power steering apparatus according to third embodiment of the present invention, respectively.
Figure 11:
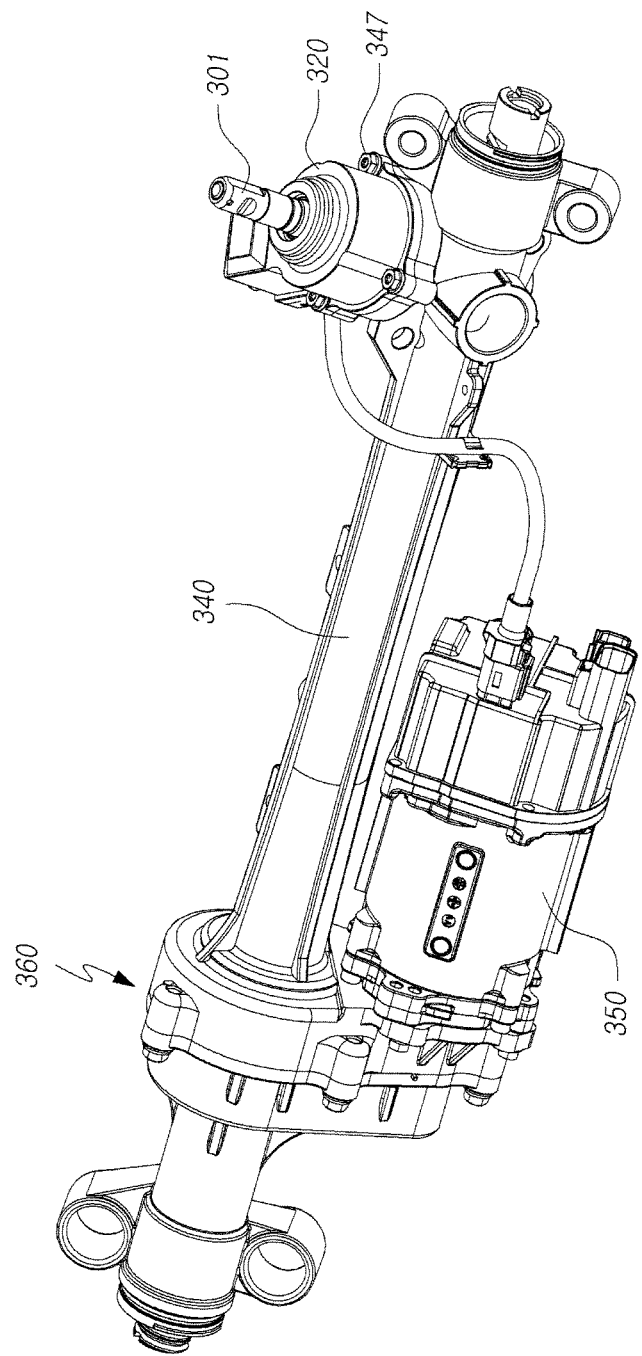

FIGS. 3 and 4 are a perspective view and a cross-sectional view illustrating a pinion sensor assembly according to a first exemplary embodiment of the present invention, respectively, FIGS. 5 and 6 are a perspective view and a cross-sectional view illustrating a cover assembly in a second exemplary embodiment of the present invention, respectively, FIGS. 7 to 9 are a perspective view, an exploded perspective view and a cross-sectional illustrating a pinion sensor cover assembly according to the second exemplary embodiment of the present invention, respectively, and FIGS. 10 and 11 are perspective views illustrating a rack housing and an electric power steering apparatus according to third embodiment of the present invention, respectively.

Referring to FIGS. 3 and 4, the pinion sensor assembly 310 according to the first embodiment of the present invention includes: an input shaft 301 connected to a steering shaft; a pinion shaft 305, the top side of which is coupled to the input shaft 301, and the bottom side of which is inserted into the rack housing 340 to be engaged with a rack bar; and a torque sensor 303 provided with a wire harness connector 303d, in which the input shaft 301 and the pinion shaft 305 coupled to the torque sensor by being axially inserted through the central part of the torque sensor 303.

The input shaft 301 is configured to be connected with the steering shaft which is rotated in cooperation with the steering wheel when a driver operates the steering wheel, and to transmit the driver's wheel operating force to the pinion shaft 305, and the pinion shaft 305 slides the rack bar because the pinion shaft 305 is configured such that the top side thereof is coupled to the input shaft 301 and the bottom side is inserted into the rack housing 340 so that the pinion gear 305a is engaged with the rack bar.

The torque sensor 303 is configured to be coupled to the input shaft 301 and the pinion shaft 305 in order to measure the driver's wheel operating force as a torque value and to provide a steering assisting force according to the measured torque value through the motor.

Accordingly, the input shaft 301 and the pinion shaft 305 are inserted through and coupled to the central part of the torque sensor 303, in which the input shaft 301 and the pinion shaft 305 are coupled to each other to be coaxially aligned, the top end of the input shaft 301 is connected to the steering wheel (see reference numeral 101 in FIG. 1) through an upper steering shaft, and the lower end of the input shaft 301 is pressure-fit to the pinion shaft 305 to transmit the steering force of the steering wheel.

Here, a torsion bar 302 is pressure-fit to the input shaft 301 and the pinion shaft 305 and then fixed by pins. Accordingly, as the driver rotates the steering wheel, the input shaft 301 connected to the steering wheel is rotated, and the pinion shaft 305 connected to the input shaft 301 via the torsion bar 302 is rotated in corporation therewith.

At this time, when a torsion occurs between the input shaft 301 and the pinion shaft 305, a difference in rotating angle is caused between the pinion shaft 305 and the input shaft 301, and when the difference in rotating angle is caused, the torque sensor 303 measures the torque as a change of magnetic fluxes.

The torque sensor 303 is provided with a wire harness connector 303*d* to transmit the measured torque value to the ECU, and is also provided with a first cylinder part 303*a*, into which the input shaft 301 is inserted, and a second cylinder part 303*b*, into which the pinion shaft 305 is inserted.

That is, in order to measure the difference in rotating angle due to the torsion of the input shaft 301 and the pinion shaft 305, the torque sensor 303 is provided with the first cylinder part 303*a* and the second cylinder part 303*b*, in which the first cylinder part 303*a* is coupled to the top side of the torque sensor 303 so that outer periphery of the input shaft 301 is inserted into the first cylinder part 303*a*, and the second cylinder part 303*b* is coupled to the bottom side of the torque sensor 303 so that the outer periphery of the pinion shaft 305 is inserted into the second cylinder part 303*b*.

In addition, the input shaft 301 is provided with a first seating part 302*a* diametrically protruding on the bottom side outer peripheral portion, so that a terminal end of the first cylinder part 303*a* is supported by and coupled to the first seating part 302*a*, and the pinion shaft 305 is provided with a second seating part 305*b* diametrically protruding on the top side outer peripheral portion, so that a terminal end of the second cylinder part 305*b* is supported by and coupled to the second seating part 305*b*.

Accordingly, when the input shaft 301 is rotated, the first cylinder part 303*a* is rotated together with the input shaft 301, and when the pinion shaft 305 is rotated, the second cylinder part 303*b* is rotated together with the pinion shaft 305. Thus, the torque sensor 303 can measure the difference in rotating angle due to the torsion of the pinion shaft 301 and the pinion shaft 305.

Meanwhile, the torque sensor 303 is formed with a diametrically extending support part 303*c*, and the wire harness connector 303*d* protrudes axially upward at an end of the top side of the support part 303*c*. Thus, the direction of the wire harness can be fixed as a wire harness connector 303*d* is housed in an internal empty space of a cover 320*a* to be described later.

Referring to FIGS. 5 to 9, the pinion sensor cover assembly 330 according to the second exemplary embodiment of the present invention includes a pinion sensor assembly 310 and a cover assembly 320. The pinion sensor assembly 310 includes: an input shaft 301 connected with a steering shaft; a pinion shaft 305, the top side of which is coupled to the input shaft 301, and the bottom side of which is inserted into a rack housing 340 to be engaged with a rack bar; a torque sensor 303 provided with a wire harness connector 303*d*, the input shaft 301 and the pinion shaft 305 being inserted through and coupled to the central part of the torque sensor 303. The cover assembly 320 includes: a cover 320*a* formed with a through-hole 323 in the top side thereof and an opened space in the bottom side, in which the input shaft 301 is inserted through the through-hole 323, and the torque sensor 303 is housed in the opened space, the cover 320*a* being provided with a fixing unit 321 at a side thereof to fix a wire connected with the wire harness connector 303*d*; a sealing member 325 coupled to the inside of the through-hole 323 of the cover 320*a* and tightly contacted with the outer periphery of the input shaft 310 to prevent the introduction of foreign matter from the outside; and a support member 327 coupled to the inside of the through-hole 323 of the cover 320*a* to support the rotation of the input shaft 301.

Here, because the pinion sensor assembly 310 is the same as that of the first exemplary embodiment, the description thereof will be omitted.

The cover assembly 320 coupled to the pinion sensor assembly 310 includes the cover 320*a*, the sealing member 325, and the support member 327, in which the cover 320*a* is configured such that the cover 320*a* encloses the torque sensor 303, and the input shaft 301 and the pinion shaft 305 extend through the cover 320*a*.

That is, on the top side of the cover 320*a*, the through-hole 323 is formed, through which the input shaft 301 extends, and one the bottom side thereof, the opened empty space is formed to house the torque sensor 303, in which on a side of the cover 320*a*, the fixing unit 321 is formed to fix a connector connected with the wire harness connector 303*d* provided in the torque sensor 303.

In addition, in the inside of the through-hole 323, the sealing member 325 for preventing the introduction of foreign matter and the support member 327 for supporting the rotation of the input shaft 301 are coupled to each other.

In the inside of the through-hole 323 of the cover 320*a*, a first step part 323*a* and a second step part 323*b* which have increased diameters are continuously formed from the top side to the bottom side of the through-hole 323, in which a sealing member 325 is coupled to the first step part 323*a* to prevent foreign matter from being introduced through the through-hole 323 from the outside, and the support member 327 is coupled to the second step part 323*b* to support the rotation of the input shaft 301.

Accordingly, as illustrated in FIGS. 8 and 9 when assembling the cover 320*a* with the pinion sensor assembly 310, the pinion sensor assembly 310 is assembled upward from the bottom side of the cover 320*a* while press-fitting the input shaft 301 to the support member 327.

In addition, on the lower terminal end of the cover 320*a*, a fixing groove 328 formed as a recess is provided, into which an elastic member is inserted, so that when the cover 320*a* and the rack housing 340 are assembled with each other, the elastic member is compressed and joined between the cover 320*a* and the rack housing 340, thereby absorbing rattle noise and vibration.

In addition, the cover 320*a* is provided with a diametrically protruding mounting part 329 at the lower end thereof, and fastening holes 329*a* are formed in the mounting part 329 to join fastening members 347, thereby being correspondingly coupled to the fastening holes 345*a* formed in the mounting part 345 of the rack housing 340.

Referring to FIGS. 10 and 11, the power steering apparatus according to the third exemplary embodiment of the present invention includes a pinion sensor assembly 310, a cover assembly 320, and a rack housing 340. The pinion assembly includes: an input shaft connected with a steering shaft; a pinion shaft 305, the top side of which is coupled to the input shaft 301, and the bottom side of which is inserted into the rack housing 340 to be engaged with a rack bar; and a torque sensor 303, which is provided with a wire harness connector 303d at a side end thereof, the input shaft 301 and the pinion shaft 305 being inserted through and coupled to a central part of the torque sensor 303. The cover assembly 320 includes: a cover 320a formed with a through-hole 323 in the top side thereof and an opened space in the bottom side, in which the input shaft 301 is inserted through the through-hole 323, and the torque sensor 303 is housed in the opened space, the cover 320a being provided with a fixing unit 321 at a side thereof to fix a wire connected with the wire harness connector 303d; a sealing member 325 coupled to the inside of the through-hole 323 of the cover 320a and tightly contacted with the outer periphery of the input shaft 301 to prevent the introduction of foreign matter from the outside; and a support member 327 coupled to the inside of the through-hole 323 of the cover 320a to support the rotation of the input shaft 301. On the top side thereof, the rack housing 340 includes: a seating surface 341a, on which the torque sensor 303 is seated; a cover coupling part 343 formed around the outer periphery of the seating surface 341a, the cover 320 being coupled to the cover coupling part 343; and a pinion coupling part 340a formed in the inside of the seating surface 341a, and formed with a shaft hole 342, into which the pinion shaft 305 is inserted. On the other side, the rack housing 340 includes a power assisting module 360 configured to be driven by an ECU according to the torque value measured by the torque sensor 303.

Here, because the pinion sensor assembly 310 is the same as that of the first exemplary embodiment of the present invention, and the cover assembly 320 is the same as that of the second exemplary embodiment, the description thereof will be omitted.

The rack housing 340 incorporates a rack bar in the inside thereof and is fixed to a body of a vehicle, in which the rack bar is engaged with the pinion gear 305a of the pinion shaft 305. The rack housing 340 is provided with the pinion coupling part 340a, to which the pinion sensor cover assembly 330 is coupled, on a side thereof, and is provided with the power assisting module 360, which is driven by the ECU, on the other side.

The pinion coupling part 340a is formed with seating surfaces 341a and 341b on which the torque sensor 303 is seated, a cover coupling part 343 formed around the outside of the coupling surfaces 341a and 341b, to which the cover 320a is coupled, and the shaft hole 342 in the inside of the seating surfaces 341a and 341b, into which the pinion shaft 305 is inserted.

In addition, the cover coupling part 343 is provided with a diametrically protruding mounting part 345 at the top end thereof, and the mounting part 345 is formed with fastening holes 345a corresponding to the fastening holes 329a of the cover 320a to be coupled by fastening members 347.

Here, the power assisting module 360 includes a motor 350 configured to generate a steering assisting power based on the control signal transmitted from the ECU, and a belt type power transmission apparatus (not illustrated) configured to transmit the assisting power generated by the motor 350 through a belt (not illustrated).

Here, because the motor 350 driven by the ECU according to the torque value measured by the torque sensor 303, and the belt type power transmission apparatus are similar to an ordinary motor and belt type power transmission apparatus, the description thereof will be omitted.

According to the present invention having the constructions and shapes as described above, it is possible to reduce an error in measuring a change in torque caused by accumulation of assembling errors of constitutional elements when assembling the torque sensor and neighboring elements, thereby preventing a malfunction, and enhancing assemblability.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A pinion sensor assembly comprising:
   an input shaft connected with a steering shaft;
   a pinion shaft, the top side of which is coupled with the input shaft, and the bottom side of which is inserted into a rack housing to be engaged with a rack bar; and
   a torque sensor provided with a wire harness connector, the input shaft and the pinion shaft being axially inserted through and coupled to the torque sensor,
   wherein the torque sensor is provided with a first cylinder part on the top side thereof, and a second cylinder part on the bottom side, and outer peripheries of the input shaft and outer peripheries of the pinion shaft are inserted into the first and second cylinder parts, respectively, and
   the input shaft is provided with a first diametrically protruding seating part on the bottom side outer peripheral part, and an end of the first cylinder part is supported by and coupled to the first seating part, and the pinion shaft is formed with a second diametrically protruding seating part on the top side outer peripheral part, and a terminal end of the second cylinder part is supported by and coupled to the second seating part.

2. The pinion assembly as claimed in claim 1, wherein the torque sensor is provided with a diametrically extending support part, and the wire harness connector is formed on the top side of the support part to axially protrude.

3. A pinion sensor cover assembly comprising:
a pinion sensor assembly as claimed in claim 2, and
a cover assembly,
wherein the cover assembly comprises:
- a cover formed with a through-hole, through which the input shaft is inserted, in the top side thereof and a space, which is opened to house the torque sensor, in the bottom side thereof, the cover being provided with a fixing unit at a side thereof to fix a wire connected with the wire harness connector;
- a sealing member coupled to the inside of the through-hole of the cover and tightly contacted with the outer periphery of the input shaft to prevent the introduction of foreign matter from the outside; and
- a support member coupled to the inside of the through-hole of the cover to support the rotation of the input shaft.

4. The pinion sensor cover assembly as claimed in claim 3, wherein the through-hole of the cover is formed with a first step part and a second step part, of which the diameters are increased, in the inside thereof, and
wherein the sealing member is coupled to the first step part and the support member is coupled to the second step part.

5. The pinion sensor cover assembly as claimed in claim 3, wherein the cover is provided with a fixing groove formed by a recess at the lower end thereof, and an elastic member is inserted into the groove.

6. The pinion sensor cover assembly as claimed in claim 3, wherein the cover is provided with a diametrically protruding mounting part at the lower end thereof, and the mounting part is formed with fastening holes.

7. An electric power steering apparatus comprising:
a pinion sensor cover assembly as claimed in any of claims 3 to 6; and
a rack housing, wherein the rack housing, on one side thereof, comprises:
- a seating surface, on which the torque sensor is seated; a cover coupling part formed around the outer periphery of the seating surface, the cover being coupled to the cover coupling part; and
- a pinion coupling part formed in the inside of the seating surface, and formed with a shaft hole, into which the pinion shaft is inserted, and the rack housing, on the other side thereof, comprises:
- a power assisting module configured to be driven by an electronic control unit according to the torque value measured by the torque sensor.

8. The electric power steering apparatus as claimed in claim 7, wherein the cover coupling part is provided with a diametrically protruding mounting part at the upper end thereof, and the mounting part is formed with fastening holes to which fastening members are coupled.

* * * * *